Nov. 12, 1940.   LE ROY G. STORY   2,221,171
POLYMERIZATION OF HYDROCARBONS
Filed Sept. 29, 1937
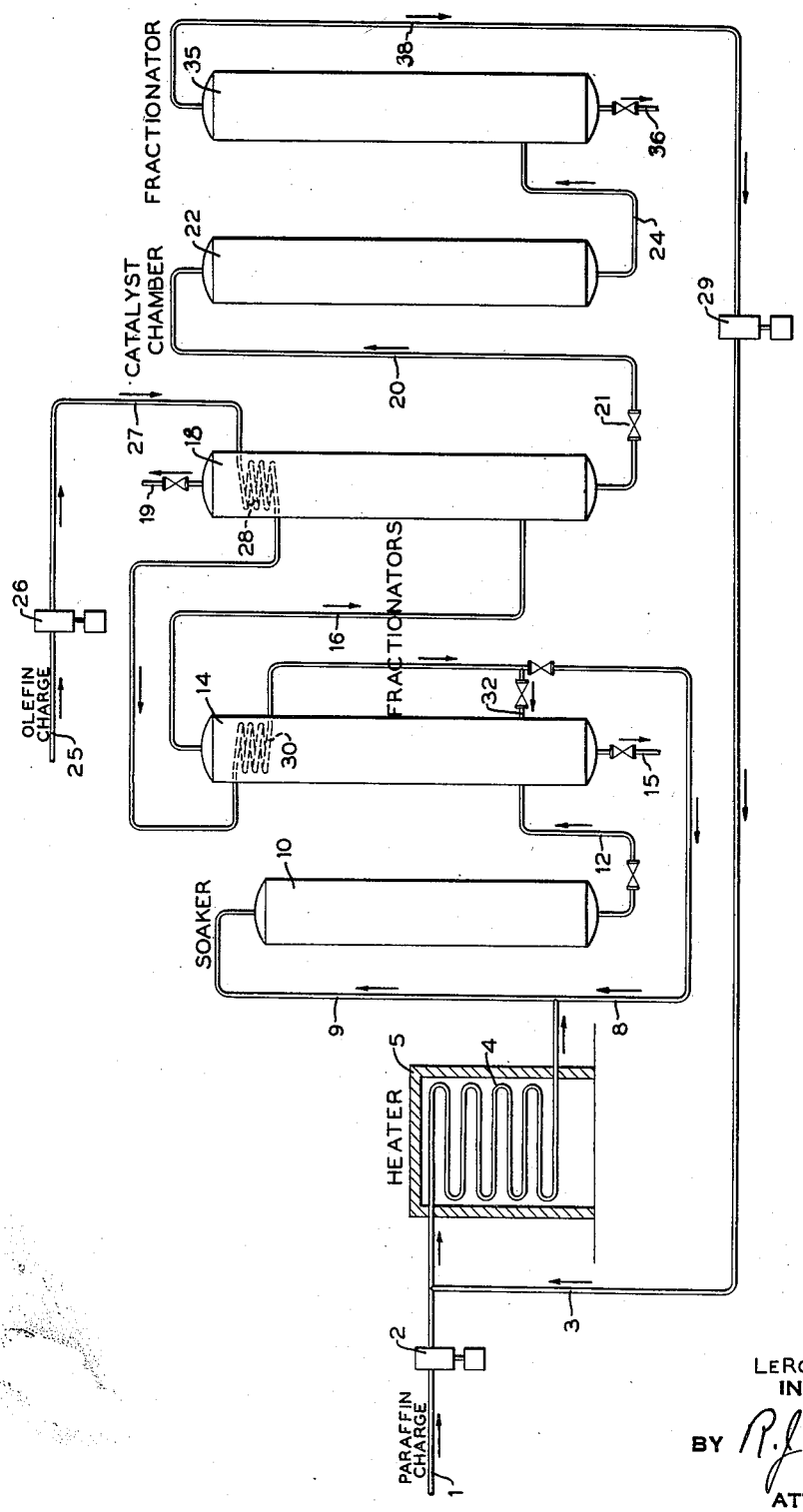
LE ROY G. STORY
INVENTOR
BY *R. J. Dearborn*
ATTORNEY Patented Nov. 12, 1940

2,221,171

UNITED STATES PATENT OFFICE 2,221,171

POLYMERIZATION OF HYDROCARBONS

Le Roy G. Story, White Plains, N. Y., assignor to The Texas Company, New York, N. Y., a corporation of Delaware Application September 29, 1937, Serial No. 166,279

3 Claims. (Cl. 196—10)

This invention relates to the conversion of normally gaseous hydrocarbons into normally liquid hydrocarbons and has to do particularly with a process in which paraffin hydrocarbons are converted into olefins and the resulting products subjected to polymerization in successive operations under the influence of heat and pressure and under the influence of an active polymerization catalyst.

In the polymerization of hydrocarbon gases containing paraffins, it is often advantageous to crack the paraffins into olefins and then subject the olefins to polymerization. Such polymerization may be achieved by subjecting the olefins to a lower temperature than the cracking operation and under a high pressure, and by contacting the olefins with an active catalyst of the phosphoric acid type. An advantageous method of operation is to first subject the olefin gases to partial polymerization under the influence of heat and pressure and then to further subject the unpolymerized olefins to polymerization in the presence of an active catalyst to polymerize a further portion of the olefins. The invention comprises other features which will be understood from the following description read in connection with the accompanying drawing which shows diagrammatically one form of apparatus for carrying out the process of the invention.

Referring to the drawing, a paraffinic charging stock which may be fresh charge introduced through the line 1 and pump 2, or recycle stock from the line 3, or a mixture thereof, is forced under pressure through the heating coil 4 located in the furnace 5. The gases which may be under a pressure of 500–5000 pounds and preferably around 2000–3000 pounds, are heated to temperatures of about 1050–1250° F., and preferably around 1100–1250° F. The reaction time is intended to be only sufficient to convert the paraffins into a maximum amount of olefins and may be about 1–5 minutes and preferably around 3 minutes or less. The reaction products are then reduced in temperature either by heat exchange or by introduction of cooler gases through the line 8 into the transfer line 9. The products are introduced into the soaker or reaction drum 10, wherein polymerization is allowed to take place and a portion of the olefins is polymerized. Conditions maintained in the soaker may be about the pressures heretofore specified, and temperatures of 1000° F. or less, such as 800–1000° F. and preferably around 900–1000° F. The reaction time may vary from about 3 to 30 minutes, depending on the extent of the polymerization desired. It is intended that sufficient polymerization takes place in the soaker to polymerize at least the more reactive components of the olefins and may vary to the extent whereby the resulting polymer may be a heavy product in the nature of resinous or tarry material, or a liquid polymer containing a substantial amount of polymerization products from the more active olefins; for example, the polymerization products of the iso-butylene, such as di-isobutylene. The nature of the polymerization products resulting from this partial polymerization will also depend on the nature of the products subjected to polymerization. It is desirable to obtain a product from the cracking operation which will produce aliphatic hydrocarbons of high antiknock quality suitable for the manufacture of motor fuel from the partial polymerization operation. It is to be understood that any number of soakers may be used to accomplish the desired polymerization.

The reaction products from the soaker 10 are transferred through the line 12 to fractionator 14. In the fractionator, the temperature is allowed to drop sufficiently to condense the desired amount of the normally liquid hydrocarbons. The extent of this condensation may vary from complete condensation of all normally liquid hydrocarbons to a partial condensation whereby only the higher boiling polymers, for example, those above 5 or 6 carbon atoms per molecule, are condensed. The liquid products so formed may be withdrawn from the lower portion of the fractionator through the valve controlled line 15, for use as a motor fuel or motor fuel blending reagent. The uncondensed vapors and gases are conducted from the upper portion of the fractionator 14 through the vapor line 16 to a secondary fractionator 18 which is also maintained under high pressure. In this fractionator, the products may be cooled whereby substantially all materials of higher number of carbon atoms than 2, and if desired substantially all the $C_2$ hydrocarbons, are condensed and the permanent gases, such as hydrogen, methane and a portion or all of the $C_2$ hydrocarbons are released from the top of the fractionator 18 through the valve controlled line 19. The liquid products collecting in the lower portion of the fractionator 18 are withdrawn through the line 20 and the pressure thereon may be released through the valve 21 in the line 20. It is preferable that the materials that are passed through the line 20 are at sufficiently high temperature so that when the pressure is released, substantially complete vaporization takes place. In some cases it may be desirable to eliminate the fractionator 18 and pass the products from fractionator 14 directly to the catalyst chamber 22.

An olefinic charging stock, such as cracked or other unsaturated gaseous hydrocarbons, is introduced through the line 25 and forced by the pump 26 through the line 27 to heat exchange coils 28 and 30, located in the fractionating towers 18 and 14 respectively. The olefin charging stock so introduced may constitute the entire charging stock for the system or such charging stock may be supplemented or replaced by the paraffin charging stock referred to heretofore, introduced through the line 1. It is preferable when olefinic charging stock is available to introduce the fresh charge through the line 25, whereby it is preheated in the coils 28 and 30 to temperatures of 300–600° F. and then injected into the transfer line 9 by means of the line 8, referred to heretofore. A portion or all of the olefinic charging stock may be introduced into the fractionator 14 through the by-pass line 32. One means of operation is to maintain a split stream whereby a portion is introduced into the fractionator 14 and the remainder injected into the transfer line 9. This charging stock is advantageously used by means of the preheater coils 28 and 30 and also by injection into the transfer line 9, as a means of controlling the temperatures in the system.

The unpolymerized gases and vapors passing through the line 20 are treated in the catalyst chamber 22 with an active polymerizing catalyst which is effective for polymerizing the less reactive olefins and, under suitable conditions, will effect substantially complete polymerization of the olefins present. A catalyst which is suitable for this purpose is a phosphoric acid type of catalyst and may be a calcined mixture of phosphoric acid and a solid adsorptive material, such as kieselguhr, fuller's earth, diatomaceous earth, bentonite, etc. Such a catalyst may be one of the type disclosed in U. S. Patent 2,018,065 Ipatieff, October 22, 1935. Also liquid phosphoric acid may be used by means of liquid vapor contact or the phosphoric acid distributed on finely divided material, such as silica. The treatment in the catalyst chamber 22 is preferably in the vapor phase at temperatures around 400–500° F. Ordinarily the condensates withdrawn from the bottom of the fractionator 18 will be of sufficient temperature that on releasing of pressure by means of the valve 21, substantially complete vaporization takes place. A suitable pressure for operation in the catalyst tower 22 is around 100 pounds. It is to be understood, however, that conditions may be varied so that the catalytic treatment may be partially or entirely in the liquid phase.

The reaction products are withdrawn from the bottom of the tower 22 and passed through the transfer line 24 to a fractionator 35. In this fractionator, substantially complete condensation of the normally liquid hydrocarbons is effected. The liquid polymers, mainly of gasoline boiling range, are withdrawn from the bottom of the fractionator through the valve controlled line 36. The unpolymerized gaseous hydrocarbons, comprising mainly paraffins, are conducted from the top of the fractionator 35 through the line 38 and recycled by means of the pump 29 and line 3, to the heating coil 4. Ordinarily this recycle stock will consist mainly of hydrocarbons of 3 and 4 carbon atoms per molecule, the lower gaseous hydrocarbons having been previously segregated and eliminated from the system through the exhaust line 19, communicating with the top of fractionator 18. In case there is no substantial separation of light hydrocarbons in the fractionator 18, but instead substantially the entire gaseous hydrocarbon fraction is treated in the catalyst tower 22, then it is desirable to operate the fractionator 35 whereby hydrogen, methane and a portion or all of the $C_2$ hydrocarbons are separated and discharged from the system while the heavier gaseous hydrocarbons, such as $C_3$ and $C_4$ hydrocarbons are recycled.

As an example of the operation of the invention, an unsaturated gaseous hydrocarbon charging stock, such as cracked gases or gases separated from a cracking still, is preheated and commingled with the cracked gases discharged from a cracking coil in which paraffin hydrocarbons are cracked. The proportions of materials and the conditions are maintained whereby the mixture may be subjected to reaction in a soaker at temperatures of about 900–1000° F. and pressures of about 2000–2500 pounds. A time of reaction around 10 to 20 minutes is allowed. The reaction products are discharged into a fractionator and the polymer product separated consisting mainly of olefinic hydrocarbons falling within the upper range of gasoline, and containing a substantial amount of $C_8$ hydrocarbons. The unpolymerized gases and vapors were further fractionated under high pressure whereby the hydrogen and methane and a portion of the $C_2$ hydrocarbons were separated and released from the system as gases. The remaining products were vaporized by reduction in pressure and the vapors contacted with a solid phosphoric acid type of catalyst at a temperature of about 450° F. and a pressure of around 100 pounds. The reaction products were discharged into a fractionator wherein a polymer product was condensed and separated. This polymer comprised a large proportion of hydrocarbons of the lower boiling range of gasoline, which may be mixed with the primary polymer, referred to heretofore, to form a blend having substantially commercial gasoline characteristics. The unpolymerized gases comprising $C_3$ and $C_4$ hydrocarbons and substantially of paraffinic character, were recycled to the heating coil wherein they were cracked under pressures of about 2500 pounds and temperatures of around 1250° F. Extraneous charging stock, consisting mainly of propane and butane, was introduced into the heating coil in sufficient amounts to balance the operation, depending on the character, particularly with respect to the unsaturation content, of the unsaturated gaseous charge. An ultimate yield of about 80% of gasoline having an antiknock value around 90 was obtained.

An advantage of the process of the invention is the high conversion per pass and high ultimate yield, due in part to the substantially complete removal of the olefins from the reaction products, whereby a recycle stock substantially entirely of paraffinic character is obtained and which is subjected to the high temperature cracking operation. By avoiding the heating of olefins in the cracking coil, the degradation and loss of the unsaturates are avoided. Also when carrying out of the polymerization operation in successive stages, utilizing the preliminary polymerization stage operating under high temperature and high pressure, a portion of the unsaturated constituents is polymerized, particularly, the more reactive materials, whereby the load on the catalytic polymerization stage is relieved and a cleaner charge to the catalytic stage is obtained, whereby the active catalyst is less susceptible to poisoning and the life of the catalyst is materially extended.

Obviously many modifications and variations of the invention, as hereinbefore set forth, may be made without departing from the spirit and scope thereof and therefore only such limitations should be imposed as are indicated in the appended claims.

I claim:

1. A process for the conversion of normally gaseous hydrocarbons to normally liquid hydrocarbons, which comprises subjecting hydrocarbon gases containing paraffin hydrocarbons of greater number of carbon atoms than one to temperatures sufficient to convert a substantial amount of said paraffins to olefins, subjecting the products of reaction to reaction at a lower temperature and a high pressure whereby a portion of the olefins is polymerized to liquids, passing in heat exchange with the polymerization products charging stock containing olefin hydrocarbons, thereafter commingling said charging stock with the products subjected to the polymerization operation, separating at least a portion of said liquids formed in the polymerization operation, subjecting the remaining vapors and gases to polymerization in the presence of a phosphoric acid type of catalyst to polymerize a further portion of the olefins to liquids, separating the liquids formed in the latter polymerization step and recycling unpolymerized gases to the conversion operation.

2. A process for the conversion of normally gaseous hydrocarbons to normally liquid hydrocarbons, which comprises subjecting hydrocarbon gases containing paraffin hydrocarbons of greater number of carbon atoms than one to temperatures sufficient to convert a substantial amount of said paraffins to olefins, subjecting the products of reaction to polymerization at a lower temperature and sufficient pressure to convert a portion of the olefins to normally liquid hydrocarbons, passing fresh charging stock in indirect heat exchange with the products from the polymerization operation thereby preheating the charge and condensing normally liquid hydrocarbons, commingling the preheated charge with the conversion products subjected to the polymerization operation, separating the condensed hydrocarbons, subjecting the uncondensed hydrocarbons to catalytic polymerization whereby the remaining olefins are substantially polymerized, separating the resultant polymers and recycling the unpolymerized gases containing paraffin hydrocarbons to the first mentioned conversion operation.

3. A process for the conversion of normally gaseous hydrocarbons to normally liquid hydrocarbons, which comprises subjecting hydrocarbon gases containing paraffin hydrocarbons of greater number of carbon atoms than one to temperatures sufficient to convert a substantial amount of said paraffins to olefins, subjecting the products of reaction to polymerization at a lower temperature and sufficient pressure to convert a portion of the olefins to normally liquid hydrocarbons, passing fresh charging stock in indirect heat exchange with the products from the polymerization operation thereby preheating the charge and condensing normally liquid hydrocarbons, subjecting the uncondensed hydrocarbons to catalytic polymerization whereby the remaining olefins are substantially polymerized, separating the polymers, recycling the unpolymerized gases containing paraffin hydrocarbons to the first mentioned conversion operation, and commingling a portion of said preheated charge with the gases subjected to the catalytic polymerization operation and another portion with the gases subjected to the thermal polymerization operation.

LE ROY G. STORY.